United States Patent

[11] 3,563,461

[72] Inventors Howard W. Cole, Jr.
12 Vale Drive, Mountain Lakes,
N.J. 07046, and Alan G. Beattie,
16 Omaha Ave.,
Rockaway, N.Y. 11693
[21] Appl. No. 747,556
[22] Filed July 25, 1968
[45] Patented Feb. 16, 1971

[54] AGRICULTURAL SYSTEM FOR IRRIGATING AND PROTECTING CROPS
10 Claims, 8 Drawing Figs.
[52] U.S. Cl. .................................................. 239/9,
239/8, 239/10, 239/214, 239/428
[51] Int. Cl. .................................................. A62c 1/12
[50] Field of Search ........................................ 239/8, 9,
10, 311, 310, 77, 214, 222, 233, 400, 428, 462,
340; 169/15; 55/87; 252/382, 106; 222/1, 202;
47/48.5

[56] References Cited
UNITED STATES PATENTS
2,090,602 8/1937 Urquhart ....................... 169/15
2,180,084 11/1939 Gebauer ....................... 239/462
2,765,856 10/1956 Schultz ......................... 239/340X
3,342,271 9/1967 Anthony, Jr. ................. 239/428X
3,363,806 1/1968 Blakeslee et al. ............. 222/202X
3,464,626 9/1969 Stamps et al. ................ 239/10
FOREIGN PATENTS
511,654 4/1955 Canada ......................... 239/233

Primary Examiner—M. Henson Wood, Jr.
Assistant Examiner—Thomas C. Culp, Jr.
Attorney—Sandoe, Neill, Schottler & Wikstrom ABSTRACT: This specification discloses a method and apparatus for a total agricultural control system having piping leading to all of the trees of an orchard, or all of the crops growing in a field, with the system equipped for selectively irrigating, spraying, dusting, and protecting the crops from freezing. The system generates foam which is used to protect the crops from freezing, and this foam provides a vehicle for carrying fertilizers, insecticides and herbicides to the crops. The foam distribution system is used also for water when irrigating and the water can be used to wash foam from the crops after a cold spell is over. The disclosure includes a special type foam generator in which water, air and foaming agent are forced through a turbilizer under controlled conditions, and a diffuser nozzle with a rotating deflector which throws the foam in different directions necessary to spread it over the crops. The specification discloses a special method for protecting heavily pruned trees from frost by expanding foam outwardly over the closely growing branches.

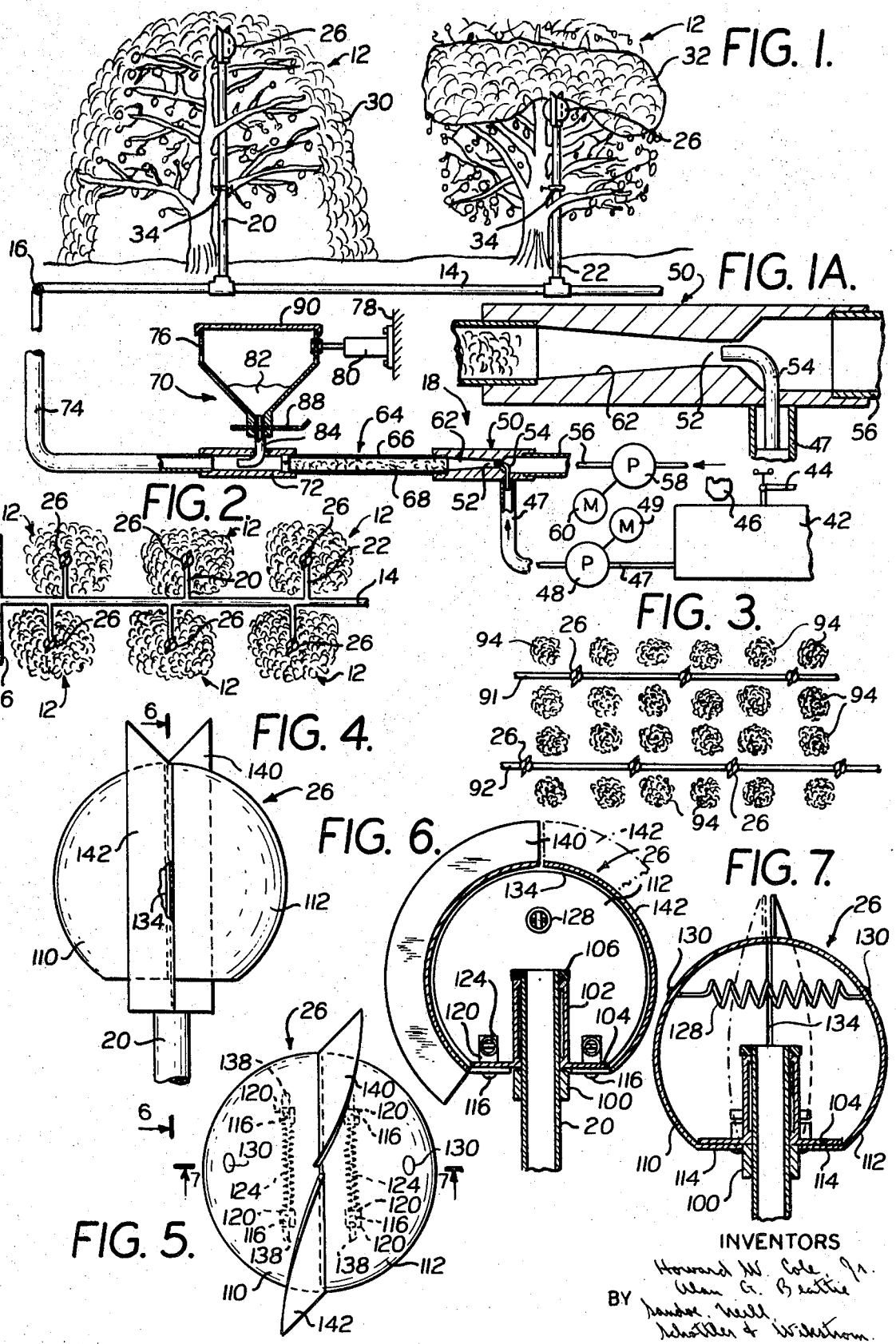

AGRICULTURAL SYSTEM FOR IRRIGATING AND PROTECTING CROPS

SUMMARY AND BACKGROUND OF THE INVENTION

This invention provides a single piping system which serves a number of different purposes. The piping system can be used for water so that it serves the usual purpose of irrigation. The same system is used in cold weather to protect crops from freezing by spreading foam over the crops. This is an unusual way of protecting crops and to provide such protection effectively it is necessary to have special equipment for generating the foam and for distributing it from a piping system in a manner to blanket the crops and protect them from damage by frost.

The equipment that generates the foam can make foam that serves as a vehicle for carrying insecticide to the crops. A sticky foam will hold the insecticide on the crops at the locations where it is needed and when the foam dissipates, the insecticide is left as a coating on the crops.

Foam can be used to carry solids such as powder which is commonly used for dusting crops, and also solids of larger particle size, for example from one-eighth to three-sixteenths inches in breadth. Pellets of fertilizer can be carried by the foam. The invention provides a way for carrying solids through a pipe without requiring velocities and turbulence to keep the solids agitated.

The nozzles that provide the distribution of foam are also suitable for distributing herbicides, and abscission agents, with either foam or water as a vehicle.

The system when using foam, generates the foam at a central station where there is enough energy available to obtain a substantial turbulence and sufficient velocity and pressure drop to make a foam that is stable and stiff. A foam is considered "stable" when substantial amounts of it will persist in the atmosphere under standard conditions for at least 4 hours. The foam can be made with air or with any gas that is compatible with the foam. For example, ethylene gas can be used and it serves as an abscission agent on the crops to which the foam is supplied. One of the advantages of foam as a vehicle for carrying gas, liquid or solids to the crops is that the foam does not freeze in subfreezing weather.

The distribution of the foam from the nozzle at the individual trees of an orchard, or over specific crop areas, requires special nozzles. These nozzles preferably rotate and have means moved by the energy of the foam stream to deflect the stream in varying but controlled directions.

The nozzles are preferably constructed with outlets that expand to greater cross section in response to increased internal pressure. The outlets can expand to pass solid particles such as material in pellet form.

BRIEF DESCRIPTION OF DRAWING

FIG. 1 is a diagrammatic view showing the system of this invention applied to an orchard and with nozzles for distributing the foam to the trees in a manner to protect the trees from frost;

FIG. 1A is an enlarged scale view of a part of the apparatus shown in the system of FIG. 1;

FIG. 2 is a diagrammatic top plan view showing the system applied to the orchard of FIG. 1;

FIG. 3 is a diagrammatic top plan view showing the system applied to a field in which crops are growing;

FIG. 4 is a side elevation of one of the nozzles used in the systems shown in FIGS. 1—3;

FIG. 5 is a top plan view of the nozzle shown in FIG. 4;

FIG. 6 is a sectional view taken on the line 6–6 of FIG. 4; and

FIG. 7 is a sectional view taken on the line 7–7 of FIG. 5.

DETAILED DESCRIPTION OF THE PREFERRED EMBODIMENTS

FIGS. 1 and 2 show a portion of an orange grove containing trees 12 located in rows, in accordance with conventional practice. There are liquid distributing lines of piping 14 extending along different rows of trees and each of the distributing lines 14 is supplied with liquid from a header 16 connected with a central control station 18. There is a vertical tube 20 or 22 located near each of the trees 12 and connected with one or the other near each of the distributing lines 14. A nozzle 26 is attached to the upper end of each of the vertical tubes 20 and 22. Many orchards are equipped with liquid distributing lines and nozzles at the various trees for irrigation purposes. Water is supplied through the distributing lines to the trees during the periods of dry weather.

This invention uses special nozzles 26 which can distribute water but which are constructed so as to distribute foam when foam is supplied to the nozzles 26 through the distributing lines 14 and tubes 20 and 22. This foam is supplied from the same central station 18 and header 16 as is used to supply water for irrigation.

According to this invention, the foam is preferably applied to individual trees 12 in either of two ways. One way is shown on the tree 12 at the left in FIG. 1. This tree has a vertical tube 20, located near the horizontal center region of the tree and extending up to a height above the branches of the tree. The nozzle 26 is located somewhat above the top of the tree.

When the left-hand tree 12 in FIG. 1 is to be protected by foam, the foam pumped through the vertical tube 20 is discharged through the nozzle 26 above the tree and the foam drops on the top of the tree. A mass of foam 30 is supported by the top branches and spreads horizontally as it increases in volume.

When the foam mass 30 reaches a width equal to the upper part of the tree 12, further increases in the width of the mass of foam causes foam to drop down the sides of the tree where it falls on lower branches and coats them in much the same way as a tree is coated by a fall of wet snow. At places where the branch system is not dense, some foam works its way into the interior of the tree, but even if all the foam is confined to the outside of the tree, as shown in FIG. 1 on the left-hand tree 12, the tree and its fruit are adequately protected.

A second way of protecting the tree which has been extensively pruned and has a dense branch system is shown on the right-hand tree in FIG. 1. The vertical tube 22, located near the horizontal center region of the tree 12, extends upward to a height which locates the nozzle 26 somewhere between the top of the tree and a mid point in the vertical extent of the branch system of the tree. A mass of foam 32 from the nozzle 26 is displaced upward and outward horizontally from the nozzle.

Because of the density of the branch system of the right hand tree 12, the mass of foam 32 is supported sufficiently to cause it to distribute to the outer horizontal limits of the tree, and to be displaced upwardly among the branches above the nozzle 26 at the same time that the foam mass gradually works its way down by gravity among the lower branches.

The foam distribution technique illustrated on the right-hand tree in FIG. 1 is advantageous at locations where there is some wind and where foam covering only the outside of the tree may be blown away. If the trees of a grove have extremely dense branch systems, then the foaming agent can be compounded so as to produce a foam which is less stiff and which will work its way down through the branches when applied like the foam mass 32 of FIG. 1. Even if the foam mass 32 does not work its way down through the lower branches of the tree, the continued horizontal spreading of the foam 32 causes it to dribble down the outside of the tree so that the lower branches are protected.

The vertical line 22 is preferably made with telescoping sections so that the nozzle 26 can be adjusted from time to time to different elevations, depending upon changes in the height of the tree or changes in the density of the branch system. A clamp 34 is used to lock the telescoping sections at any desired adjustment.

The length of time that the foam will last depends upon the composition of the foaming agent, and upon the efficiency of the apparatus which generate the foam. More lasting foams can be produced by foaming agents which are of somewhat higher cost, but it is not necessarily desirable to have the trees covered with the most long-lasting foam which can be obtained. On the contrary, this invention uses successive distributions of foams over periods of time which are spaced from one another depending upon circumstances such as the temperature to be protected against, the wind conditions in the grove, and the chemical makeup of the particular foaming agent. In accordance with one feature of the invention, severe conditions can be dealt with by making successive applications of foam. Such successive applications not only renew the foam masses which are protecting the trees, but they supply heat because the new foam is supplied through the distributing lines at temperatures which are higher than the temperature to which the existing foam on the trees has fallen after prolonged exposure.

At the central station 18 there is a tank 42 with a connection 44 through which water is supplied to the tank. There is a supply source 46 for foaming agent. The mixed water and foaming agent is pumped through a pipe 47 by a pump 48 driven by a motor 49. The pipe 47 leads to a venturi fitting 50 having a throat 52.

FIG. 1a shows the venturi fitting 50 on an enlarged scale. It has a center pipe 54 which is a continuation of the passage through the pipe 47. The diameter of this center pipe 54 is less than the diameter of the throat 52 so that there is an annular clearance around the center pipe 54 at the throat 52. Compressed air is introduced into the venturi fitting 50 through a pipe 56 which communicates with the annular clearance around the center pipe 54 at the throat 52. The compressed air is supplied at superatmospheric pressure by a pump 58, illustrated diagrammatically in FIG. 1, and this pump 58 is driven by a motor 60. The compression of the air by the pump 58 supplies additional energy for the foam by making the foam with compressed air.

In the venturi fitting 50 shown in FIG. 1a, the stream of water mixed with the foaming agent and ejected from the center pipe 58 can be used to exert an aspirator action on air to draw the air from the pipe 56; or the air stream from the pipe 56 can be at a velocity to exert an aspirator action on the mixed water and foaming agent in the center pipe 54. In the preferred construction, however, both of the streams, that is, the stream of water and foaming agents from the center pipe 54 and the stream of air from the pipe 56 are under pressure and are positively pumped into the venturi fitting 50 by the pumps 48 and 58 and these streams mixed in the expanding portion of the venturi fitting 50. This expanding portion or nozzle is indicated by the reference character 62 and the effect on the mixed stream of water, foaming agent and air, as it expands in cross section in the nozzle 62, is to convert the throat velocity at least partially into additional pressure of the stream.

Beyond the nozzle 62, the mixed water, foaming agent and air is forced through a foam generator or turbilizer 64 consisting of a length of pipe 66 filled with wadding 68 which is preferably steel wool made of stainless steel. The surfaces of the wadding 68 provide a multitude of deflectors against which the stream of water, foaming agent and air impinges and is deflected with such violence as to cause foaming of the stream into a stiff foam.

Beyond the foam generator 64 there is an additive station 70 which includes a chamber 72 through which the foam passes on its way to piping 74 which leads to the header 16.

The additive station 70 also includes a hopper 76 supported from a bulkhead 78 and having a vibrator 80 for shaking the hopper to prevent arching of the powder 82 which is in the hopper. At its lower end, the hopper 76 has a discharge pipe 84 which leads into the chamber 72 and which faces downstream in the chamber 72. There are means for controlling the rate of flow of powder from the hopper 82, or for cutting off the flow as desired. This means is shown diagrammatically as a plate 88 which slides across the outlet of the hopper 76. There are one or more openings in the plate 88 and the rate of flow of powder from the hopper depends on whether a large or small opening is brought into register with the hopper outlet or whether an opening is brought only partially into register. The hopper 76 has a lid 90 which can be made to fit tightly on the hopper so that the interior of the hopper can be pressurized if desired.

The hopper 90 can be filled with insecticide in the form of powder such as is commonly used for dusting crops; or it can be used for a herbicide, or for any material in powdered form which is to be conveyed to the trees or other crops with the foam as the vehicle for carrying the solid powder. Some insecticides are partially soluble in the foam, but the additive station 70 makes it possible to supply the insecticide to the foam in much larger quantities than it is soluble so that more insecticides can be carried to the trees or plants for a given quantity of foam.

The invention is not limited to the control of fruit trees, and FIG. 3 shows distributing lines 91 and 92 extending along the ground between rows of low growing vegetation 94. There are nozzles 26 at outlets along the pipes 91 and 92 for distributing foam over the vegetation 94. In order to obtain a uniform distribution of the foam over the vegetation 94, the spacing of the nozzles 26 along the distributing pipes 91 and 92 is approximately equal to the spacing of these distributing pipes from one another.

FIGS. 4—7 show the construction of one of the nozzles 26. Near the upper end of the pipe 20 there is a collar 100. The nozzle 26 includes a sleeve fitting 102 which extends around the pipe 20 above the collar 100 and which rests on the collar 100 as a thrust bearing. There is a flange 104 extending radially outward from the lower end of the sleeve fitting 102. Another collar 106 at the upper end of the pipe 20 prevents the sleeve fitting 102 from being displaced upwardly and thus holds the sleeve fitting 102 on the pipe 20. The sleeve fitting 102 is free to rotate on the pipe 20 and all of the other parts of the nozzle 26 are carried by the sleeve fitting 102 and its connected flange 104 so that they rotate as a unit.

The nozzle 26 is formed with two substantially hemispherical shells 110 and 112. Each of these shells 110 and 112 has a flattened bottom portion 114 which is attached to the underside of the flange 104 by screws 116 which extend upward through the flat portions 114 and to the flange 104. These screws 116 thread into blocks 120 on top of the flange 104. In the preferred construction the screws 116 extend through slots in the flange 104 so as to allow for some movement of the shells 110 and 112 toward and from one another.

There are springs 124 stretched between the blocks 120 of one shell to the corresponding blocks 120 of the other shell. This urges the lower portions of the shells to move closer together. There is a single center spring 127 connected to the shells 110 and 112 by fastenings 130; and this spring 128 is under some tension so as to urge the upper portions of the shells to move closer to one another.

There is preferably a narrow gap or discharge outlet 134 between the confronting edges of the shells 110 and 112. The screws 116 can be made to extend through slots 138 which have their ends located so as to always maintain a minimum gap or discharge outlet 134 between the confronting edges of the shells.

For one side of the shell 110 there is a deflector baffle 140 attached to the shell 110 along the edge that confronts the other shell across the gap 134. This baffle 140 slopes to the right and deflects the foam that discharges through the gap 134 on one side of the nozzle.

There is a corresponding baffle 142 attached to the shell 112 on the other side of the nozzle and along the edge that confronts the other shell across the gap 134. This baffle 142 slopes to the left and deflects the foam that discharges through the gap. Since the baffles 140 and 142 slope in opposite directions and are located on opposite sides of the nozzle 26, it will be apparent that the reaction of the deflected foam stream against these baffles rotates the nozzle 26 in a counterclockwise direction in FIG. 5.

The foam stream issues through the gap 134 at substantial velocity and the rotary motion of the nozzle facilitates the throwing or slinging of the foam from the nozzle across any unobstructed space between the nozzle and the portion of the tree or other vegetation over which the foam is to be distributed. When the nozzle 26 is located well within a tree having a thick branch system, as the right hand tree in FIG. 1, the space around the nozzle is filled up with foam and the nozzle builds up the body of foam and expands it outwardly by pressure from within the nozzle with little or no effect produced by the rotation of the nozzle except the even distribution of the foam around the circumference of the nozzle. With the nozzle located at the top of a tree or in space between growing crops as in FIG. 3, the slinging of the foam by the rotating nozzles is effective to distribute the foam over a much larger area than would otherwise be the case.

The rate of discharge of the foam from the nozzle 26 can be increased by increasing the pressure of the foam; but it can also be increased by widening of the gap 134 and in the preferred construction this gap widens automatically with increase in pressure because the rise in pressure within the nozzle stretches the springs 124 and 128 to let the gap 134 widen. This increases the rate of discharge from the nozzles without unduly increasing the velocity of the discharge. If the velocity were allowed to become too high, then the foam would be distributed at some distance from the nozzles and would not be evenly distributed over areas close to the nozzles. For some situations, such as shown in FIG. 3, the building up of foam immediately around the area of the nozzles is not necessary. It is more important that the foam be thrown outward so as to cover the growing crops which are spaced along rows with each individual plant some distance from the nearest nozzle.

Instead of the straight edges shown along the edges of the gap 134, the edges may be serrated with extending portions of the serrations overlapping one another so that the depressions between the extending portions of the serrations provide a series of discrete jet openings in the nozzles.

The invention provides a method of keeping a gas in contact with a growing crop by producing a stable foam with the gas as the inflatant for the bubbles of the foam. After applying the foam to the crop, the inside bubbles in contact with the crop, as they burst, provide a blanket of gas in contact with the crop.

Leaf fertilizer can be held in contact with a crop by including the fertilizer in a sticky and stable foam which is applied to the leaves and which maintains the fertilizer on the leaf for an extended time.

The preferred embodiments of the invention have been illustrated and described, but changes and modifications can be made, and some features can be used in different combinations without departing from the invention as defined in the claims.

I claim:

1. An agricultural control system including in combination closed pressure apparatus for foam distribution comprising a central control station, piping with branches leading to locations close to crops that are to be controlled, each branch having an outlet, a nozzle at each outlet through which foam under pressure is discharged from the branch, means for introducing water and a foaming agent under pressure into the piping at the central control station, means for introducing gas under pressure into the water and foaming agent mix, a turbilizer in the piping downstream from the location at which the air is introduced, the turbilizer having surfaces on which the mixed gas, water and agent impinge, said surfaces being correlated with the means that introduce water, foaming agent and gas so as to whip the mixture into a stable foam at the velocities at which said means introduce the mixture of water, foaming agent and gas.

2. The agricultural control system described in claim 1 characterized by a supply device for introducing solid particles of material into foam flowing under pressure in the piping, said device being downstream from the turbilizer, said solid particles such as a solid insecticide or solid fertilizer, being carried by the foam as a vehicle to the nozzles for discharge with the foam from the nozzles and into contact with the crops.

3. The agricultural control system described in claim 2 characterized by a hopper for holding the solid particles, vibrator means at the hopper for insuring flow of the solid particles, and metering means at the hopper for controlling the rate of solid particle flow into the piping, said metering means providing a solid particle flow substantially in excess of the quantity of solid particles that can be dissolved by the foam whereby solid particles are carried in the solid state distributed through the foam as a vehicle.

4. The agricultural control system described in claim 1 characterized by said means for introducing gas including a compressor that supplies the gas to the piping at superatmospheric pressure for storing energy in the mixed stream that travels through the piping, the nozzles at the outlets being slinging nozzles each of which has a rotatable portion that rotates about an axis and each of which has a reaction surface on which the mixed stream impinges to rotate the rotatable portion of the nozzle.

5. The agricultural control system described in claim 4 characterized by each of the nozzles including a housing having a slot therein from which the mixed stream expands and discharges, and fins on the outside of the housing in the path of the stream discharging from the slot, said fins constituting the reaction surface on which the stream impinges to rotate the rotatable portion of the nozzle.

6. The agricultural control system described in claim 4 characterized by each of the nozzles including a housing formed in two partially spherical parts that meet along an arc of the sphere, the parts being movable toward and from one another to open and close a slot at said line, spring means urging the parts together to close the slot, the force of the spring means being less than the force of the foam stream within the nozzle so that the parts are moved to open the slot by the energy of the stream including the compressed gas therein, and a bearing on which the rotatable part of the nozzle turns to sling the mixed stream that issues from the slot.

7. The agricultural control system described in claim 1 characterized by an injection station for introducing additives into the piping to be carried by the mixed stream to the nozzles, said injection station including a container for the additive, a passage from the container leading into the piping, and metering means in the passage for proportioning the flow of additive from the container with respect to the flow of mixed stream to the nozzles.

8. The agricultural control system described in claim 7 characterized by the metering means being a valve in the passage from the container to the piping, and means for adjusting the degree of opening of the valve to control the flow from the container.

9. The agricultural control system described in claim 7 characterized by the means for introducing water, foaming agent, and gas into the piping including a venturi passage having a throat and an expanding nozzle section beyond the throat and upstream from the turbilizer, a center passage at the throat with a generally annular passage surrounding the center passage, one of the passages at the throat being part of the means for introducing water and foaming agent into the piping and the other of the passages at the throat being part of the means for introducing gas into the piping, the water, foaming agent and gas mixing at said throat, the turbilizer including metal wadding downstream from the venturi passage whereby the velocity of the mixed stream is converted partially into a pressure increase in the stream as the stream approaches the wadding of the turbilizer.

10. The agricultural control system described in claim 9 characterized by the means for introducing gas into the piping including an air compressor that delivers air at superatmospheric pressure for increasing the energy of the mixed stream.